(12) United States Patent
Pilu et al.

(10) Patent No.: US 8,300,941 B2
(45) Date of Patent: Oct. 30, 2012

(54) METHOD AND APPARATUS FOR READING A SURFACE CODED PATTERN

(75) Inventors: Maurizio Pilu, London (GB); Guy Adams, Stroud GLOS (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1131 days.

(21) Appl. No.: 12/179,762

(22) Filed: Jul. 25, 2008

(65) Prior Publication Data

US 2009/0034850 A1    Feb. 5, 2009

(30) Foreign Application Priority Data

Jul. 31, 2007 (GB) .................................. 0714917.2

(51) Int. Cl.
*G06K 9/62* (2006.01)
(52) U.S. Cl. ...... 382/181; 382/103; 382/199; 178/18.01
(58) Field of Classification Search .................. 382/181
See application file for complete search history.

(56) References Cited

U.S. PATENT DOCUMENTS

| | | | | |
|---|---|---|---|---|
| 6,548,768 | B1 * | 4/2003 | Pettersson et al. | 178/18.01 |
| 2005/0173544 | A1 | 8/2005 | Yoshida | |
| 2007/0001950 | A1 | 1/2007 | Zhang et al. | |
| 2007/0081695 | A1 * | 4/2007 | Foxlin et al. | 382/103 |
| 2008/0159630 | A1 * | 7/2008 | Sharon et al. | 382/199 |

FOREIGN PATENT DOCUMENTS

WO    WO 2005/043448 A2    5/2005

OTHER PUBLICATIONS

Se, Stephen "Zebra-crossing detection for the partially sighted," Computer Vision and Pattern Recognition, 2000. Proceedings. IEEE Conference on , vol. 2, no., pp. 211-217 vol. 2, 2000 doi: 10.1109/CVPR.2000.854787 URL: http://ieeexplore.ieee.org/stamp/stamp.jsp?tp=&arnumber=854787&isnumber=18560.*

* cited by examiner

*Primary Examiner* — Atiba O Fitzpatrick
*Assistant Examiner* — Thomas A James

(57) ABSTRACT

A method of determining a regular grid pattern from a surface coded pattern that comprises the regular grid pattern interleaved with a further data carrying pattern wherein the surface coded pattern is subject to perspective distortion, the method comprising:
    extracting a set of straight line hypotheses from the coded surface pattern;
    clustering the straight line hypotheses by orientation;
    for each cluster, extracting a set of line pencil hypotheses;
    generating a set of regular grid hypotheses from pairs of the line pencil hypotheses; and
    determining the best regular grid hypothesis.

19 Claims, 11 Drawing Sheets

METHOD AND APPARATUS FOR READING A SURFACE CODED PATTERN

CROSS-REFERENCE TO RELATED APPLICATION

This application claims priority to co-pending GB Application No. 0714917.2 filed Jul. 31, 2007, entitled "Method and Apparatus for Reading a Surface Coded Pattern". which is entirely incorporated herein by reference.

TECHNICAL FIELD

With the almost universal adoption of computing and in particular the Internet it has been recognised that there is potentially significant user value if conventional paper and print can be integrated or connected to the digital resources available via computing systems and the Internet. Such integration may cover a wide range of tasks, from the ability to electronically capture any writing on paper and relate the captured data automatically to the context, e.g. form filling, to pointing to a printed hyperlink on a paper document with an electronic pointing device to access related material, such as related video or audio data, which may be presented on an associated electronic device. Such interactive use of paper and the associated enabling of technologies can be referred to as digital pen and paper (DPP).

BACKGROUND TO THE INVENTION

Presently, DPP solutions predominantly consist of a fine pattern of printed optical marks over the whole surface of the paper that when imaged by a miniature camera near the tip of a pen or other electronic pointing device provides absolute position and page information. An example of such a system is given in U.S. Pat. No. 6,548,768 to Anoto A B. According to U.S. Pat. No. 6,548,768, a position code is defined by the combination of the position of a visible dot in relation to an invisible virtual grid vertex reference point. The layout of the virtual grid is defined by the overall arrangement of the visible dots and is deduced by imaging a number of dot locations. The actual position coding data is decoded by determining the position of the visible dot in relation to its virtual grid vertex reference point. For four dot positions around the grid vertex, four unique values can be encoded in any one grid position.

An alternative position coding pattern has been developed by the current applicant and is the subject of International patent application WO 2005/043448. This document discloses an optical position code comprising a first reference grid of marks that provides the position anchors to then detect within the four corners one of nine possible positions of a data mark, thereby defining an alphabet of nine symbols corresponding to the different dot displacements on the inner grid. This pattern is then repeated across the surface of the paper.

In the predominant digital pen and paper systems the electronic pen or pointing device includes an imaging system, generally an optical camera system, that captures a defined field of view that encompasses a portion of the optical position code, from which the location of the electronic pen can be calculated. It will therefore be appreciated that the angle at which the electronic pen or pointer is held with respect to the plane of paper can not only vary from user to user and also vary for an individual user depending upon particular style of handwriting or use, but more importantly is rarely, if ever, orientated perpendicular to the plane of the paper on which the optical position code is printed. Consequently, the image captured by the electronic pen and its associated imaging system invariably has an element of perspective distortion associated with it. Determining the location of the optical data marks with reference to either a virtual or actual reference grid in such a distorted image can be difficult.

DESCRIPTION OF EMBODIMENTS OF THE INVENTION

According to a first aspect of the present invention there is provided a method of determining a regular grid pattern from a surface coded pattern that comprises the regular grid pattern interleaved with a further data carrying pattern wherein the surface coded pattern is subject to perspective distortion, the method comprising: extracting a set of straight line hypotheses from the coded surface pattern; clustering the straight line hypotheses by orientation; for each cluster, extracting a set of line pencil hypotheses; generating a set of regular grid hypotheses from pairs of the line pencil hypotheses; and determining the best regular grid hypothesis.

The step of extracting the set of straight line hypotheses may include: identifying triples of surface pattern points in which the surface pattern points are co-linear to one another; identifying sets of triples that co-linear to one another; deleting those sets of co-linear triples that have a cross-ratio value outside a predetermined range; and fitting a line hypothesis to each of the remaining sets of co-linear triples. The cross-ratio value may be approximately equal to 0.25.

The step of clustering the line hypotheses may comprise grouping the line hypotheses into a plurality of sets, each set encompassing line hypotheses with an angular orientation about the centre of the surface pattern within a predetermined range, and for each set clustering the line hypotheses about a common angular orientation. The step of clustering each set of line hypotheses may comprise applying a mean shift clustering algorithm.

The step of extracting the set of line pencil hypotheses for each cluster may comprise: selecting a pair of line hypotheses and determining their vanishing point and associated line pencil; determining the residual to the line pencil for the remaining line hypotheses in the cluster and determining the number of line hypotheses whose residual is within a predetermined range; repeating the previous method steps for further pairs of line hypotheses and selecting the line pencil for which the number of line hypotheses whose residual is within the predetermined range is the greatest.

The step of generating a set of regular grid hypotheses from pairs of the line pencil hypotheses may comprise: selecting a pair of line pencil hypotheses to form a grid hypothesis; and determining which of the line hypotheses associated with the selected line pencils conform to the grid hypothesis.

The step of determining the best grid hypothesis may comprise: determining the transformation that corrects the perspective distortion of a grid hypothesis; applying the determined transformation to the surface coded pattern; and applying one or more criteria to the transformed surface coded pattern to generate a measure of the validity of the grid hypothesis. The applied criteria may comprise any one or more of the following: the proportion of regular grid points to the total points of the surface coded pattern is greater than a predetermined threshold value, which may be 0.35; the average number of data carrying pattern points interleaved within the regular grid points is within a predetermined range, which may be 0.2 to 1.2; and the number of regular grid cells formed by the grid hypothesis is above a predetermined value.

According to a second aspect of the present invention there is provided a data carrier comprising a plurality of computer executable instructions that when executed by a computer cause that computer to perform the method of the first aspect of the present invention.

According to a third aspect of the present invention there is provided apparatus for determining a regular grid pattern from a surface coded pattern that comprises the regular grid pattern interleaved with a further data carrying pattern wherein the surface coded pattern is subject to perspective distortion, the apparatus comprising: an imaging system arranged to capture an electronic image of the coded surface pattern; and a data processor arranged to perform the method of the first aspect of the present invention.

BRIEF DESCRIPTION OF THE DRAWINGS

An embodiment of the present invention is described below, by way of illustrative, non-limiting, example only, and with reference to the accompanying figures, of which:

FIG. 3b schematically illustrates some of the possible reference grids that the distorted image of FIG. 3a may give rise to;

DETAILED DESCRIPTION

Figure 1:
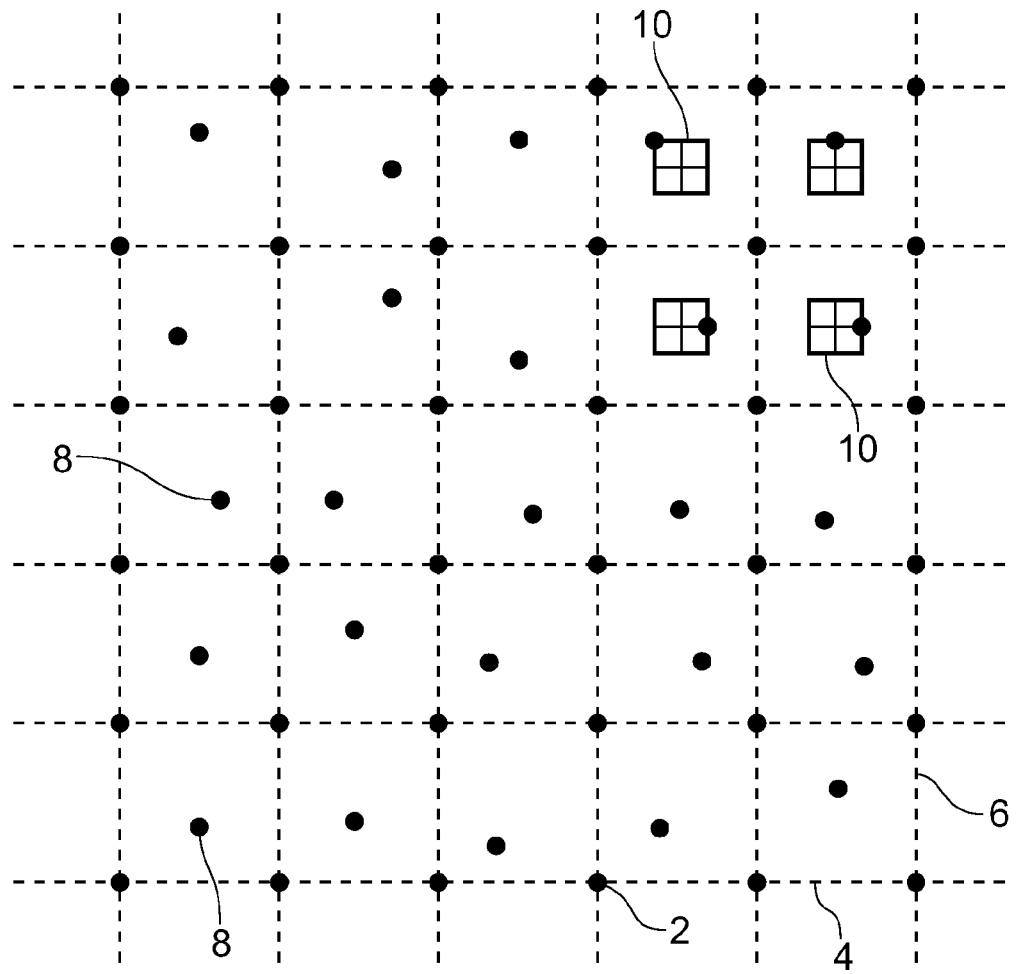
FIG. 1 illustrates a portion of an optical positioning code comprising a fixed reference grid and additional data marks.

FIG. 1 illustrates a greatly enlarged portion of an optical positioning code as developed by the current applicant. A regular grid is formed from a plurality of grid markers 2, such that the grid markers are aligned along virtual mutually orthogonal axes 4, 6. Within each individual square formed by the grid marks 2 a further data mark 8 is formed. The data mark 8 can be placed at any one of nine vertices of a 3×3 virtual array 10. The location of a data marker 8 within each square of the reference grid defines one of nine possible data symbols. In the optical code illustrated in FIG. 1 and proposed by the current applicant, the code is divided into non-overlapping blocks comprising 5×5 data symbols, since this is equivalent to the minimum field of view of the preferred imaging device. By the use of an appropriately selected data structure for every 5×5 data block and the use of a suitable error-correction code, it is possible to produce an optical position code that uniquely encodes the position of the data marker over 1 billion A4 pages.

Figure 2:
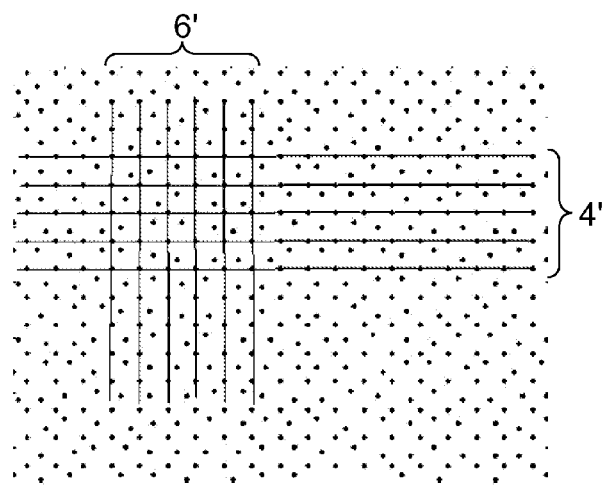
FIG. 2 illustrates a greater portion of the optical positioning code illustrated in FIG. 1 in the absence of any perspective distortion.
Figure 3A:
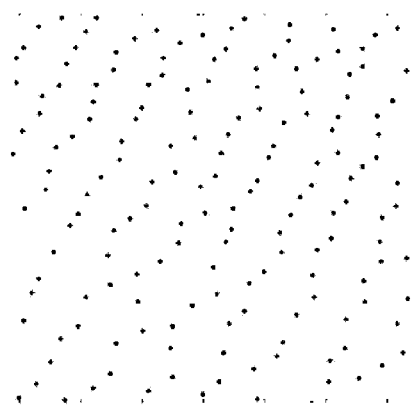
FIG. 3a illustrates a portion of the optical positioning code illustrated in FIG. 2 under a degree of perspective distortion.
Figure 3B:
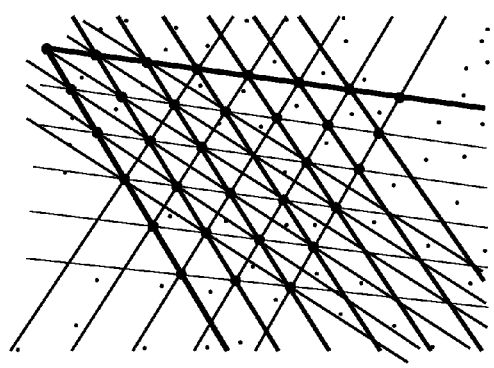

FIG. 2 illustrates a section of optical code as described with reference to FIG. 1 comprising a plurality of data blocks (each block comprising 5×5 data symbols) as imaged with a field or view orthogonal to the plane of the paper. Consequently, it is a relatively straightforward task to identify the reference grid markers 2 and their respective mutually orthogonal grid axes 4' 6'. However, when subject to perspective distortion induced by a imaging system viewing the pattern at an angle, which results in an image of the position coding pattern as represented in FIG. 3a, a number of possible alternative interpretations of the regular reference grid can be formed, as indicated in FIG. 3b. The interleaved data pattern increases the difficulty in detecting the correct regular reference grid in the circumstances.

Figure 4:
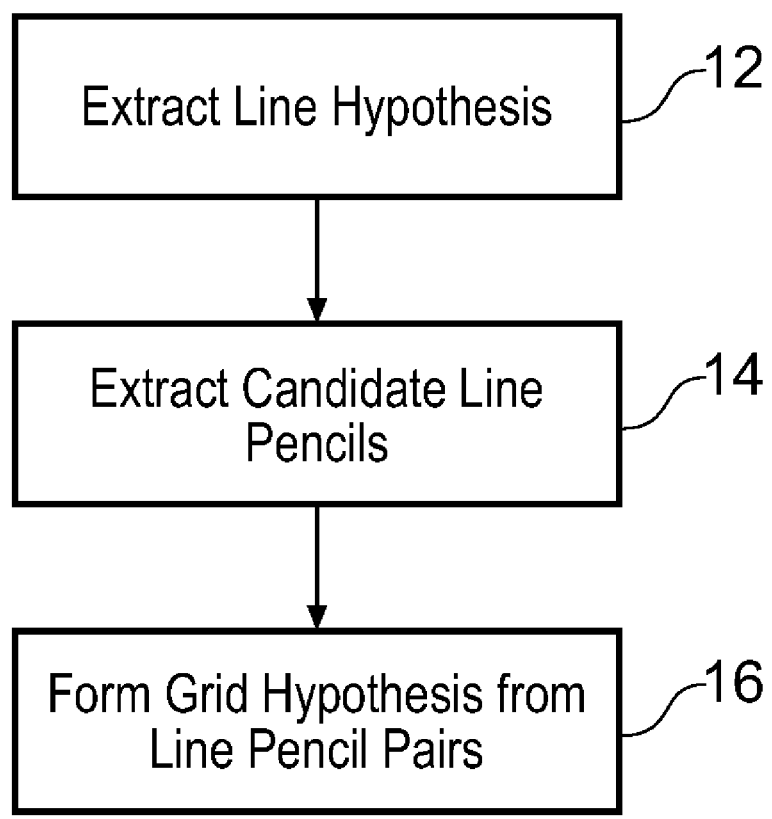
FIG. 4 illustrates the overall method steps of embodiments of the present invention.

FIG. 4 indicates the basic method steps according to embodiments of the present invention for determining the regular reference grid markers 2 from a perspectively distorted optical code image. In the first step 12 a number of possible straight lines are extracted from the distorted image, each possible straight line being formed from a plurality of marker points. In the second method step 14 those candidate lines that share a common vanishing point are grouped together. The final method step 16 is to identify an optimum pair of line groups, such that the chosen grid lines are regularly spaced under perspective projection consistent with the vanishing points of the respective groups.

Figure 5:
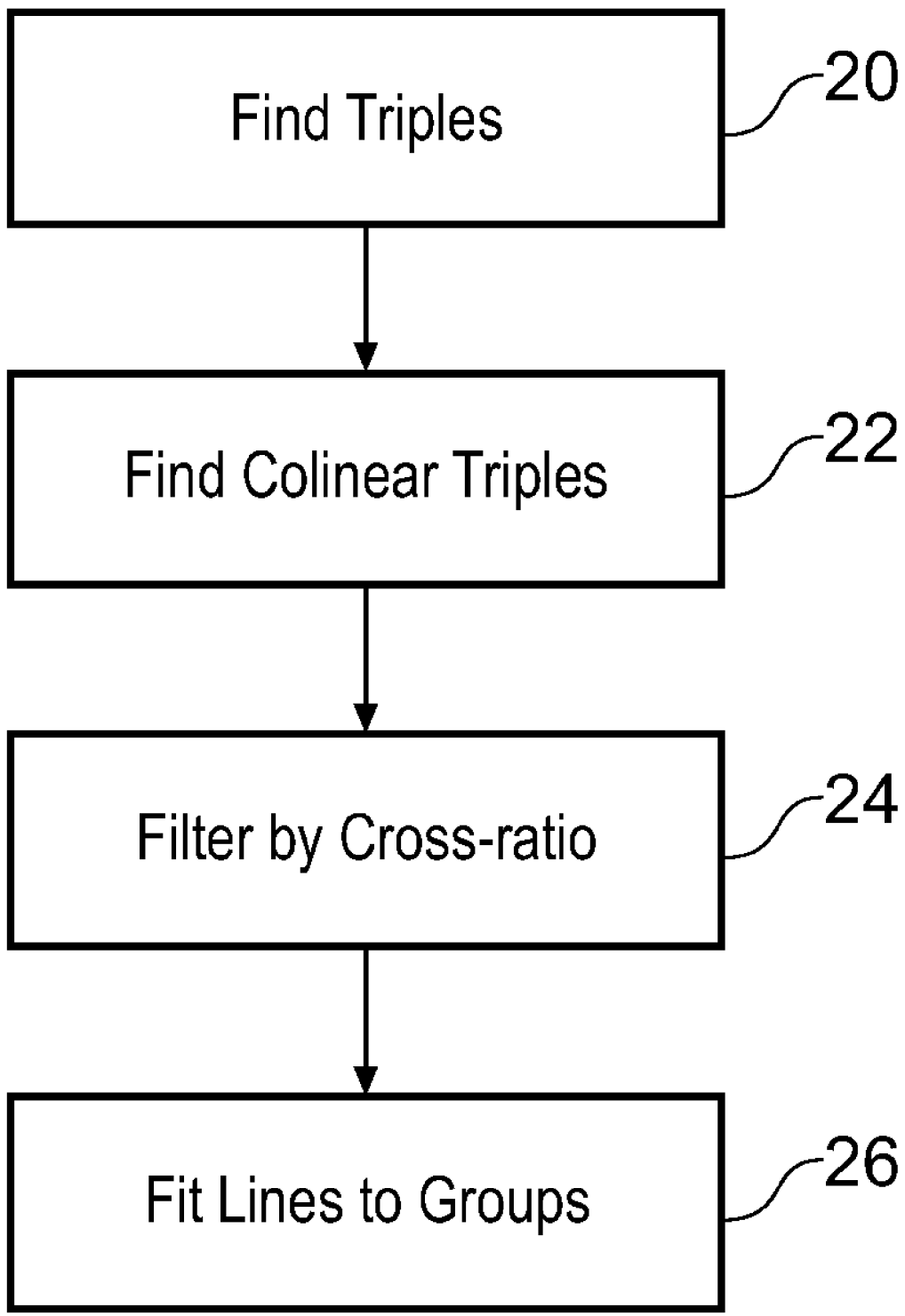
FIG. 5 illustrates the individual steps forming the first method step shown in FIG. 4.
Figure 6:
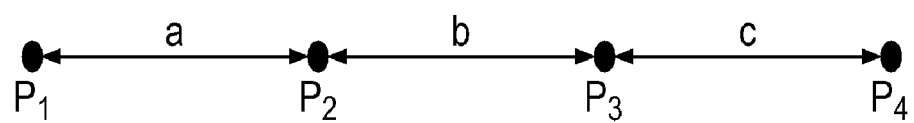
FIG. 6 schematically illustrates a plurality of points forming part of a line hypotheses.
Figure 7:
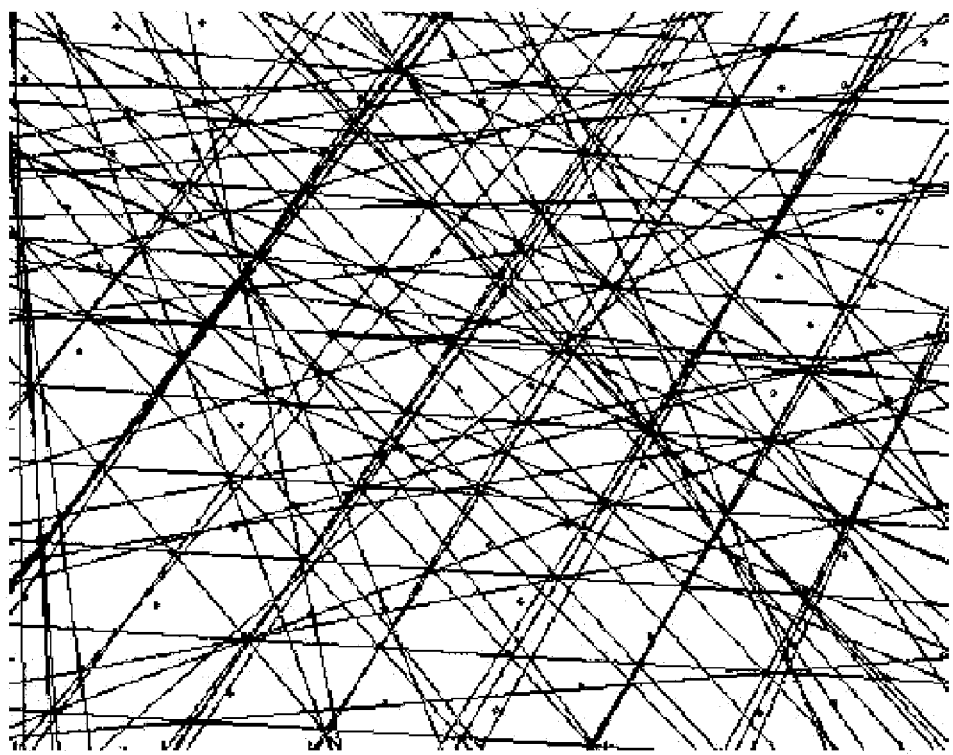
FIG. 7 illustrates a portion of an optical code image after the line hypotheses step of FIG. 4 has been performed.

FIG. 5 illustrates one possible method of extracting the line hypotheses, i.e. step 1 of the method illustrated in FIG. 4. The first step 20 is to identify groups of three markers that are approximately collinear and equidistant from one another, since three such points represent the minimum definition of a possible regular grid line. Each group of three points can be referred to as a triple. The second step 22 comprises identifying groups of triples that are themselves collinear and thus form an extended straight group of triples. Several tens to a few hundreds of groups of triples may be identified at this stage. The next step 24 the number of groups of triples is reduced by selecting only those groups of triples having a cross ratio of approximately 0.25. With reference to FIG. 6, the cross ratio of any four points $P_1$-$P_4$ lying along a line and separated by distances a, b and c is given by the expression $(a \times c)/(a+b) \times (b+c)$. By filtering each linear group of triples to find a subgroup that contains consecutive points with a cross ratio of approximately 0.25, the a priori knowledge of the grid structure to be detected, that is that the grid is regular, is exploited, since collinear, equidistant, points on the original position code pattern will also be collinear under perspective projection. For example, and with reference again to FIG. 6, in the original, undistorted, grid pattern the distances a, b and c between each printed grid point will be equal to one another. Let us assume that the distance is one unit. The cross ratio is therefore given by $(1 \times 1)/(2 \times 2) = 0.25$. In the alternative case where the grid pattern is perspectively distorted the apparent distances a, b and c between each printed point may be, for example, a=3 units, b=2 units and c=1 unit. In this case the cross ratio is given by $(3 \times 2)/(3+2) \times (2+1) = 6/15 = 0.25$. By applying this filtering methodology a new, smaller set of groups of marker points is obtained in which the groups are substantially collinear and may encompass original marker points 2 of the regular reference grid. Some degree of tolerance of the distances between the printed points, to allow for inaccuracies in the original printing process, is included by allowing the filtered cross ratio value to encompass a range of values around the ideal of 0.25. Preferably the cross ratio value will vary from the ideal of 0.25 by no more than 10%. However, depending on the amount of noise in the captured image, however, there will still be a varying number of other, rogue lines. The fourth step 26 comprises fitting the groups of collinear points determined in the previous step 24 into algebraic lines, for example by using a least square fittings process, and thus generating a full set of possible candidate straight lines. FIG. 7 illustrates the set of line hypotheses or candidate lines extracted from a portion of optical position code subject to perspective distortion similar to that illustrated in FIG. 3a.

Figure 8:
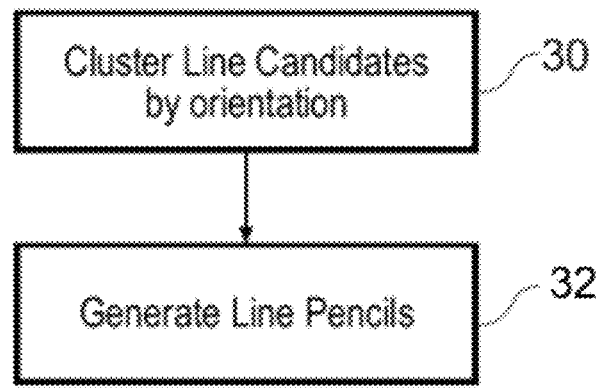
FIG. 8 schematically illustrates the individual method steps according to an embodiment of the present invention of the second step illustrated in FIG. 4.
Figure 9:
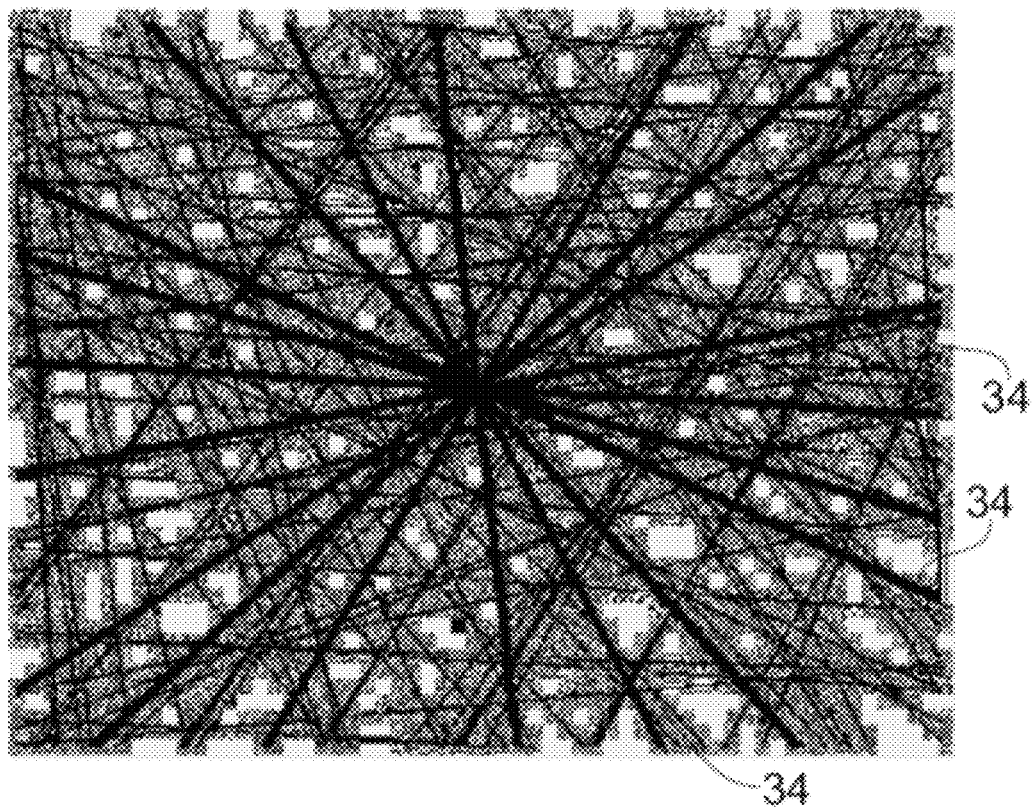
FIG. 9 illustrates the results of the method steps of FIG. 8 when applied to the line hypotheses illustrated in FIG. 7.

Having identified a full set of possible straight lines in the distorted image these lines are then grouped together by their orientation and possible common vanishing points for pairs of the grouped lines are determined. This corresponds to the second step 14 of FIG. 4 and, as illustrated in FIG. 8, can be broken down into two separate operations, first operation 30 being the clustering the line candidates by their orientation and the second operation 32 being to generate a set of line pencils. The first operation 30 is achieved by applying a clustering algorithm to the individual line candidates. In a preferred embodiment of the present invention this is achieved using mean shift clustering. However, it will be appreciated that other known clustering techniques may also be applied. The mean shift clustering technique, as will be appreciated by those skilled in the art, involves effectively determining the minimum average distance of a group of values from one another. In the case of the line candidates this is accomplished by sub-dividing the line candidates into 18 initial clusters corresponding to a fan of lines going through the image centre at equally spaced angles (20°). Then for each initial cluster the mean shift algorithm is performed to identify the actual angle within the cluster around which the majority of the candidate lines are aligned. Also as part of the clustering operation those candidate lines whose orientation with respect to the cluster centre fall outside a threshold value are deleted from the respective cluster. FIG. 9 illustrates the end result of the clustering operation as performed on the line candidates indicated in FIG. 7. The thicker solid lines 34 extending radially from the centre of the image indicate the mean directions of each cluster. It will of course be appreciated that the line candidates may be sub-divided into more or less initial clusters depending on preferred factors such as required accuracy or processing speed.

Figure 10:
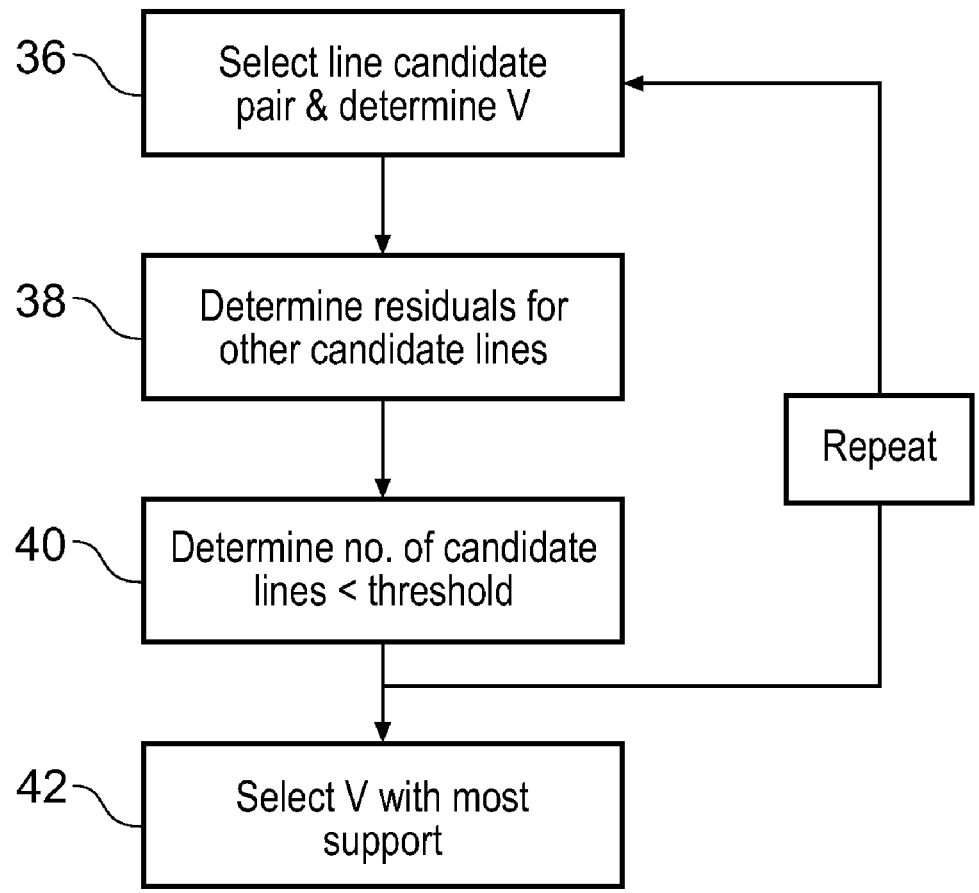
FIG. 10 illustrates the method of determining a set of line pencils according to an embodiment of the present invention.
Figure 11:
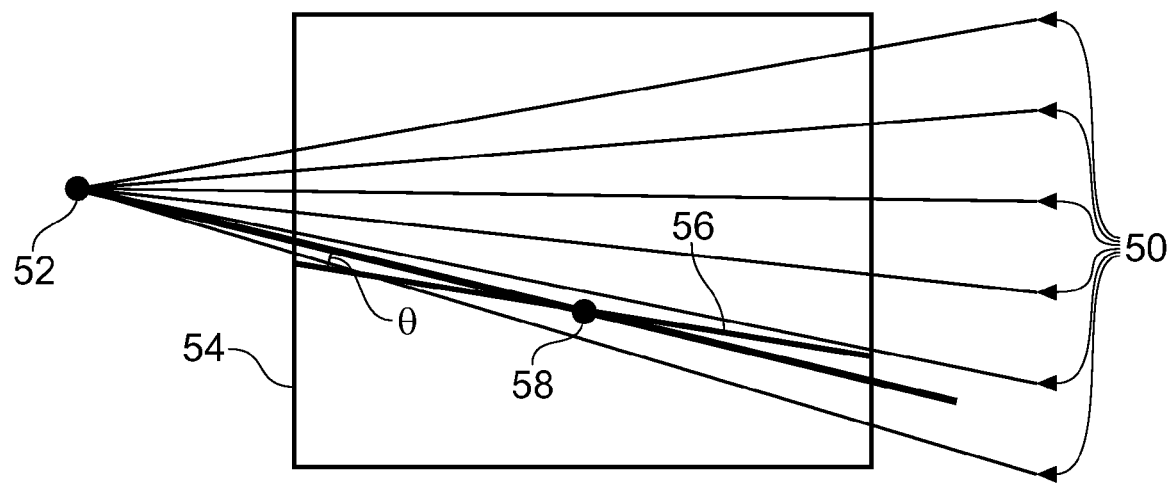
FIG. 11 schematically illustrates the relationship of a line hypotheses to a proposed line pencil according to embodiments of the present invention.

The next step 32 of FIG. 8 is to generate one or more line pencils for each cluster of candidate lines. A line pencil is the set of lines that can be drawn originating from a common vanishing point. Consequently, an alternative description of this step is the generation of one or more candidate vanishing points for each cluster of line candidates. There are several techniques known to the person skilled in the art to determine a line pencil, or vanishing point, from a set of noisy line data. However, the selected technique should preferably be capable of tolerating the relatively high level of errors contained within the groups of line candidates. In other words, the selected technique should be able to deal with the possibility that a significant number of "rogue" or invalid line hypotheses are included within each cluster. FIG. 10 schematically illustrates a preferred method of generating the line pencils for each cluster. The first step 36 is to select any two relatively separated lines at random from a particular cluster and to determine an estimate of the location of a vanishing point to which both lines converge. This is achieved by fitting a proposed vanishing point (the $v_x$, $v_y$) to the equation for a line passing through a vanishing point, $y-v_y=m(x-v_x)$. The second step 38 is to determine the residuals of the other candidate lines within the cluster with respect to the determined vanishing point. The residual of a candidate (data) line is the angle formed between the data line and a pencil line going through the barycenter of the data line in the image. In fact, where it is known that the perspective distortion is not too severe, which is the case with regards to the present invention since it is reasonable to assume that the angle of the digital pen and imaging device with respect to the coded paper will be in the range of 45° to 90°, the barycentre of the data line may be replaced by the simple mid point of the line. Referring to FIG. 11, a set of pencil lines 50 are shown originating from a proposed vanishing point 52 and extending across the image plane 54 of the captured image of the perspectively distorted optical pattern. Also illustrated is one of the candidate lines 56 from a given cluster. It will be appreciated that this candidate line is different from either of the two candidate lines from the same cluster used to generate the proposed vanishing point 52. Also illustrated is the barycenter 58 of the candidate line and the residual of this candidate line to the line pencil is indicated by angle θ. Referring back to FIG. 10, the next step 40 is to determine the number of candidate lines 56 within the cluster that have a residual that is less than a predetermined threshold. By doing so, a quantification of the support for the proposed vanishing point is obtained. This process of selecting a pair of candidate lines for the given cluster, determining the proposed vanishing point for those candidate lines, determining the residuals to that proposed vanishing point for a number of the other candidate lines in the cluster and determining the number of candidate lines that support the proposed vanishing point is repeated, either for a predetermined number of times, or until a candidate vanishing point with a predetermined level of support is found, or until all the possible pairs of candidate lines within the cluster have been selected to generate a proposed vanishing point. At this point, the final step 42 is to the subset of proposed vanishing points that have the most support. The subset may include one or more of the proposed vanishing points. As previously mentioned, this process is performed for each cluster of candidate lines and typically 4 to 20 pencils (vanishing points) are extracted at this stage.

Figure 12:
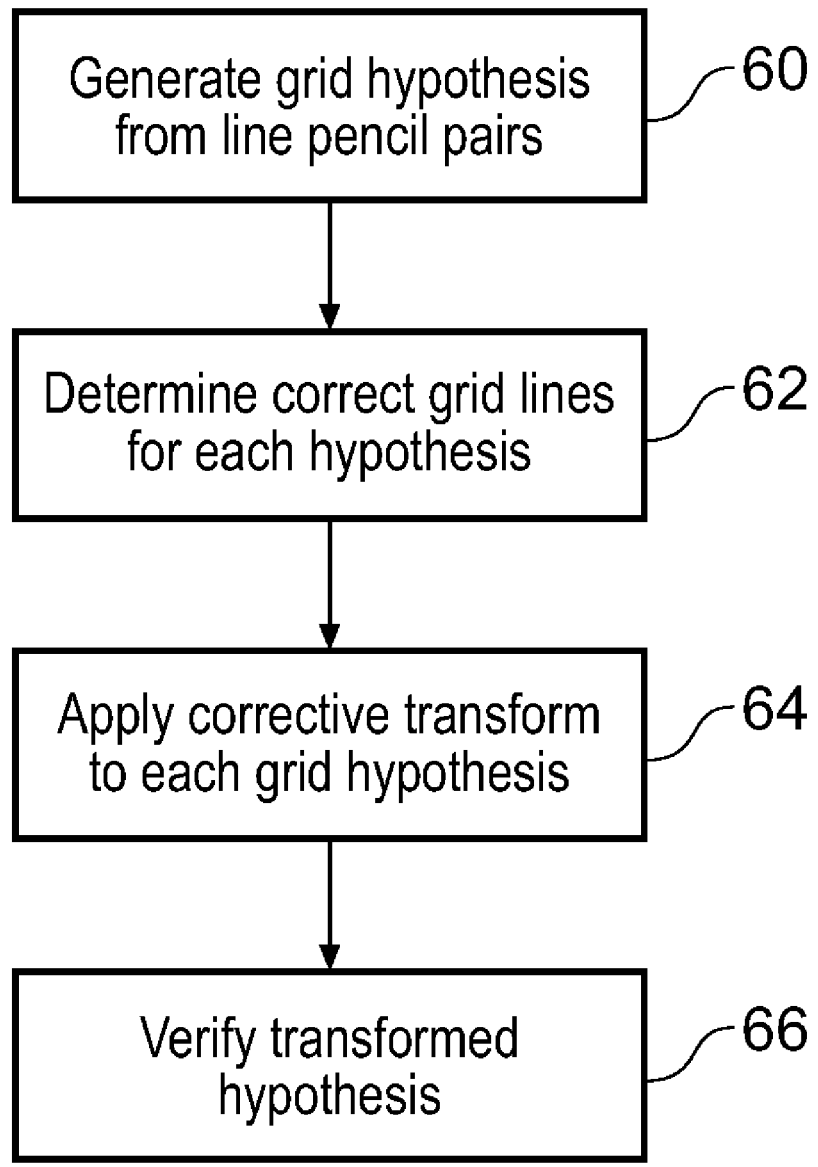
FIG. 12 illustrates the method steps according to an embodiment of the present invention for forming a grid hypotheses as indicated in FIG. 4.
Figure 13:
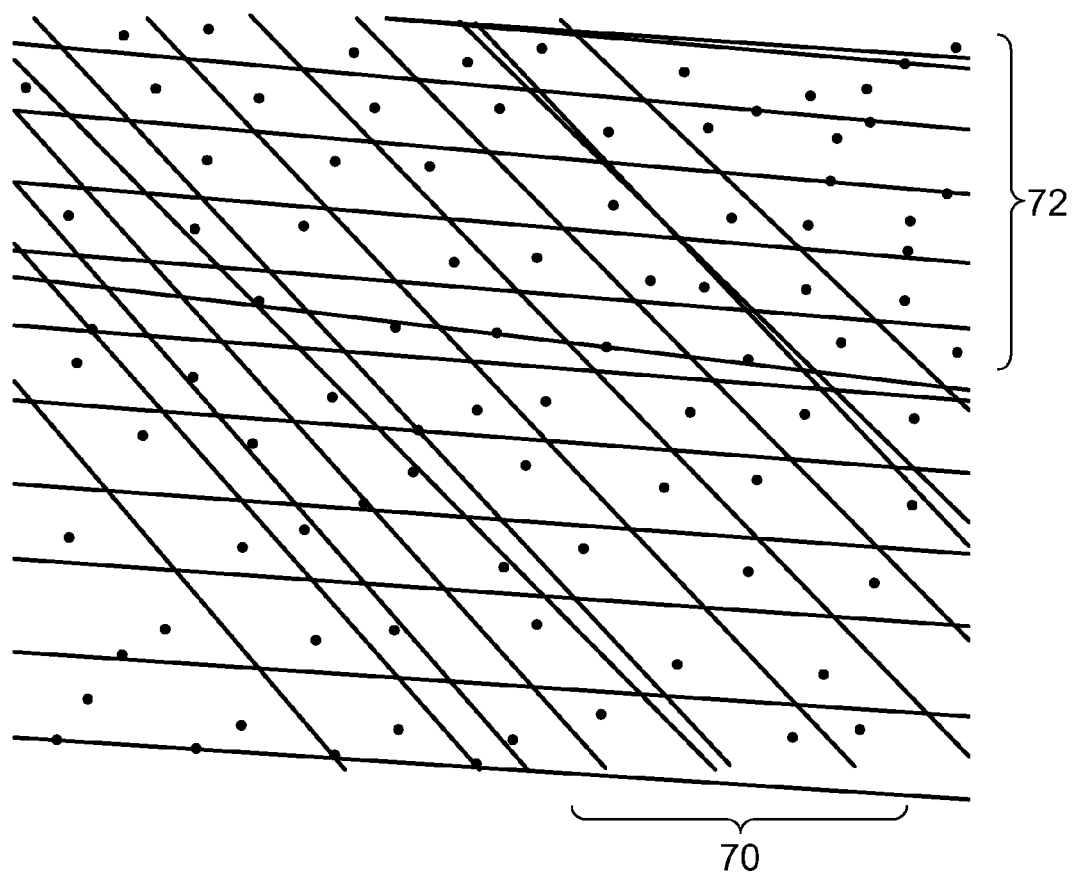
FIG. 13 illustrates a portion of the optical image illustrated in FIGS. 7 & 9 and an applicable grid hypothesis.

The final stage in the process (label 16 in FIG. 4) is to identify the pairs of line pencils (vanishing points) that give rise to a regular grid and to optimise that choice of pairs. In embodiments of the present invention this final stage is further broken down into separate processes, as illustrated in FIG. 12. The first process 60 is to generate a set of grid hypotheses, each grid hypotheses being formed from a pair of intersecting line pencils extracted from the previous stages of the overall process, since irregular point grid can be seen as the intersection of the lines belonging to two line pencils. In preferred embodiments of the present invention not all possible pairings of line pencils are used to form grid hypotheses since it is possible to employ some simple heuristic rules to eliminate implausible pairings from consideration. For example, it is reasonable to assume that the amount of perspective distortion of the original printed pattern is not too extreme, since the angle at which the electronic pen will have been held with respect to the printed pattern is unlikely to be itself too extreme. It is therefore assumed in embodiments of the present invention that the two line pencils selected to form a grid hypotheses must each be composed of two sets of nearly parallel lines and their mutual intersection angle is greater than 45°. Typically, from 1 to 50 grid hypotheses are generated at this stage and one such hypotheses is illustrated in FIG. 13, with the set of lines forming the first line pencil being labelled 70 and the second set of lines being labelled 72.

Figure 14:
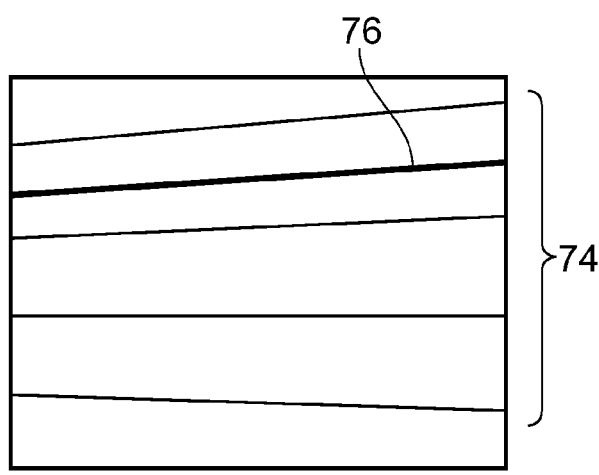
FIG. 14 schematically illustrates the possible relationships between a line hypothesis and associated line pencil.

Referring back to FIG. 12, the next process step 62 is to determine the correct grid lines for each grid hypotheses. The purpose of this stage is to determine which of the actual data (candidate) lines determined by the previous process steps could have been generated, under perspective projection from equally spaced parallel lines. This is necessary, since not all the data lines in any given determined line pencil could have arisen from the original rectangular reference grid, as some of the data lines may be "rogue" lines formed from one or more of the additional data marker points 8 (see FIG. 1). This illustrated with reference to FIG. 14, which shows a subset of data lines 74 from one of the determined line pencils, with one of the data lines 76 representing a rogue or non-grid line. However, at this point it is not known whether the grid spacing is defined by the gap between the data line 76 and the adjacent data lines or by the larger gap between the data lines other than the "rogue" line 76. To make this determination in embodiments of the present invention both alternatives are considered and the alternative having a minimum fitting cost to an idealised solution is selected. For example, with reference back to FIG. 14 if the data line 76 is considered to be an actual grid line, in which case the data line 76 is a line that is supported by the chosen model, then there must be a number of missing further grid lines located between the subsequent data line 74 shown in FIG. 14. This missing grid lines are referred to as unsupported model lines. In the alternative, where the data line 76 is considered to be a "rogue" line, with the separation between the grid lines being that shown between the remaining data line 74 and in FIG. 14, then data line 76 is considered to be a data line not represented by the selected model. For each model, or alternative, a fitting cost based on minimum description length (MDL) can be calculated. The fitting cost can be expressed by:

$$E = K_1 |L^{supp}| + K_2 |L^{uns}| + K_3 |L_D^{uns}| + K_4 \xi^2$$

where $L^{supp}$ are the set of model lines that are not supported by the actual data lines.

$L^{uns}$ are the set of model lines that are not supported by the data lines.

$L_D^{uns}$ are the set of data lines not represented by one of the models.

$\xi$ is the cumulative error between the supported data lines and their corresponding model lines (expressed in radians).

$$K_1 = K_2 = K_3 = 1, K_4 = 3$$

Figure 15:
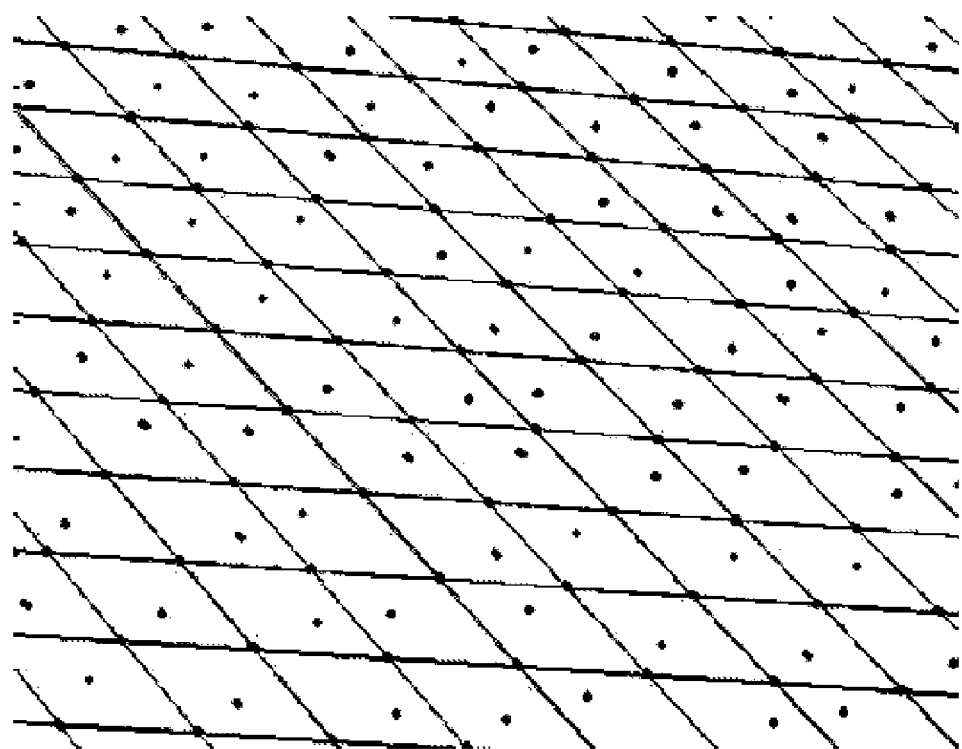
FIG. 15 schematically illustrates the portion of the optical pattern image shown in FIG. 13 after the correct grid lines have been determined for the associate grid hypothesis.

The result of this process on the grid hypotheses illustrated in FIG. 13 is similarly illustrated in FIG. 15, where only the grid lines determined to be correct are shown and as can be seen the end result is a hypotheses for a regularly spaced grid having undergone perspective distortion to which the recorded (distorted) optical pattern fits. As may be appreciated by those skilled in the art, the two alternative models referred to above with reference to FIG. 14 do not comprise a comprehensive set of possible models, since the proposed spacing between the proposed grid lines could be greater still, in which case for the example illustrated in FIG. 14 there are simply greater number of data lines not supported by the model. Consequently, in preferred embodiments of the present invention the MDL cost is calculated based on up to 8 different grid spacings. It will therefore also be appreciated that a greater or lesser number of grid spacing models could be taken into account. It will also appreciated that alternative cost fitting techniques may be applied, as well as alternative grid line models.

Referring back to FIG. 12, the next process 64, having achieved a corrected grid line hypotheses is to apply a transformation to the image relating the observed image to the original, undistorted, optical position code pattern. This is achieved by firstly determining which of the marker points on the distorted image are the regular grid points by finding those marker points that are closest to the intersections of each of the proposed grid lines. The remaining marker points therefore constitute the data marker points that are interleaved in the regular grid pattern. The required transformation is that which minimises the difference between the determined grid pattern and the original grid. In other words, the transformation $H = \arg_H \min d(G_D, HG)$.

Where $G_D$ is the set of original grid points and $d(.,.)$ is a pattern distance measure. By using as $d(.,.)$ the sum of square errors between all the model and data points, we can find H of our least square fitting using singular value decomposition. The system of equations used in this technique can be found in the literature is not reported here.

Referring back to FIG. 12, the final step 66 in the process is to verify the validity of the transformed optical pattern. This stage is performed since as mentioned above a corrective transform is applied to each of the possible grid hypotheses determined previously and is therefore desirable to both verify the validity of the final result and also to determine the optimum grid hypotheses. In preferred embodiments of the present invention the verification process involves the application for one or more heuristics to select the most appropriate hypotheses. The heuristics are preferably pattern-specific, in particular in relation to the characteristics of the interleaved data pattern and include:

The number of extracted grid points 2 (FIG. 1), $G_D$, should be above a certain proportion $T_1$ of the overall number of marker points $P_D$, i.e. $G_D/P_D$ greater than $T_1$. In preferred embodiments of the present invention $T_1 = 0.35$.

The average number of actual data marker points 8 interleave within the grid points should not be below a threshold $T_2$ or above a further threshold $T_3$. This heuristic addresses the insertion of rogue data points and/or the deletion of valid data points. Possible values are $T_2 = 0.2$ and $T_3 = 1.2$.

From the knowledge of the field of view of the imaging system it may be possible to know how many grid cells should be present in the resulting image. It is therefore possible to set a further threshold on the minimum number of cells $T_4$ that should be recovered. By appropriate selection of the heuristics used and their associated threshold values it is possible to discount all but one of the transformed grid hypotheses.

The methodology described in the above embodiments of the present invention allows the regular grid pattern of the optical position code to be reliably extractive from an image of the optical code that has been subject to perspective distortion and to therefore consequently extract the data coding embedded within the pattern image.

The invention claimed is:

1. A method of determining a regular grid pattern from a surface coded pattern that comprises the regular grid pattern interleaved with a further data carrying pattern wherein the surface coded pattern is subject to perspective distortion, the method comprising:

extracting a set of straight line hypotheses from the surface coded pattern by identifying a plurality of surface pattern points that are co-linear to one another, identifying sets of the plurality of surface pattern points that are co-linear to one another, deleting sets of the plurality of surface pattern points that have a cross-ratio value outside a predetermined range, and fitting a line hypothesis to sets of the plurality of surface pattern points that have a cross-ratio value within the predetermined range;

clustering the straight line hypotheses by orientation;

for each cluster, extracting a set of line pencil hypotheses;

generating a set of regular grid hypotheses from pairs of the line pencil hypotheses; and determining, by a processor, a regular grid hypothesis closest to a true regular grid.

2. The method of claim 1, wherein extracting the set of straight line hypotheses comprises:

identifying triples of the surface pattern points in which the surface pattern points are co-linear to one another;

identifying sets of the triples that are co-linear to one another;

deleting those sets of co-linear triples that have a cross-ratio value outside the range of 0.225 to 0.275; and fitting a line hypothesis to each of the remaining sets of co-linear triples.

3. The method of claim 2, wherein the cross-ratio value is equal to 0.25.

4. The method of claim 1, wherein clustering the straight line hypotheses comprises grouping the straight line hypotheses into a plurality of sets, each set of the group encompassing straight line hypotheses with an angular orientation about a center of the surface coded pattern within a predetermined range, and for each set of the group clustering the straight line hypotheses about a common angular orientation.

5. The method of claim 4, wherein clustering each set of the group of the straight line hypotheses comprises applying a mean shift clustering algorithm.

6. The method claim 1, wherein extracting the set of line pencil hypotheses for each cluster comprises:

selecting a pair of straight line hypotheses and determining a vanishing point and associated line pencil for the pair of straight line hypotheses;

determining the residual to the line pencil for the remaining straight line hypotheses in the cluster and determining a number of line hypotheses whose residual is within a predetermined residual range; and evaluating further pairs of straight line hypotheses and selecting the line pencil for which the number of straight line hypotheses whose residual is within the predetermined residual range is the greatest.

7. The method of claim 1, wherein generating a set of regular grid hypotheses from pairs of the line pencil hypotheses comprises:

selecting a pair of line pencil hypotheses to form a regular grid hypothesis; and determining which of the straight line hypotheses associated with the selected line pencil hypotheses conform to the regular grid hypothesis.

8. The method of claim 1, wherein determining the regular grid hypothesis closest to a true regular grid comprises:

determining a transformation that corrects a perspective distortion of a regular grid hypothesis;

applying the determined transformation to the surface coded pattern; and applying one or more criteria to the transformed surface coded pattern to generate a measure of validity of the regular grid hypothesis.

9. The method of claim 8, wherein the applied criteria comprises at least one of:

a proportion of regular grid points to a total points of the surface coded pattern is greater than a predetermined threshold value;

an average number of data carrying pattern points interleaved within the regular grid points is within a predetermined range; and a number of regular grid cells formed by the regular grid hypothesis is above a predetermined value.

10. The method of claim 9, wherein the predetermined threshold value for the proportion of regular grid points to the total points of the surface coded pattern is 0.35.

11. The method of claim 9, wherein a range of values for the average number of data carrying pattern points interleaved within the regular grid points is 0.2 to 1.2.

12. A non-transitory computer readable medium having stored thereon machine readable instructions for determining a regular grid pattern from a surface coded pattern that comprises the regular grid pattern interleaved with a further data carrying pattern wherein the surface coded pattern is subject to perspective distortion, the machine readable instructions when executed cause a computer system to:

extract a set of straight line hypotheses from the surface coded pattern;

cluster the straight line hypotheses by orientation by grouping the straight line hypotheses into a plurality of sets encompassing straight line hypotheses with an angular orientation about a center of the surface coded pattern within a predetermined range;

for each cluster, extract a set of line pencil hypotheses;

generate a set of regular grid hypotheses from pairs of the line pencil hypotheses; and determine, by a processor, a regular grid hypothesis closest to a true regular grid.

13. Apparatus for determining a regular grid pattern from a surface coded pattern that comprises the regular grid pattern interleaved with a further data carrying pattern wherein the surface coded pattern is subject to perspective distortion, the apparatus comprising:

an imaging system arranged to capture an electronic image of the ceded surface coded pattern; and a data processor arranged to execute machine readable instructions to:

extract a set of straight line hypotheses from the surface coded pattern by identifying a plurality of surface pattern points that are co-linear to one another, identifying sets of the plurality of surface pattern points that are co-linear to one another, deleting sets of the plurality of surface pattern points that have a cross-ratio value outside a predetermined range, and fitting a line hypothesis to sets of the plurality of surface pattern points that have a cross-ratio value within the predetermined range;

cluster the straight line hypotheses by orientation;

for each cluster, extract a set of line pencil hypotheses;

generate a set of regular grid hypotheses from pairs of the line pencil hypotheses; and determine a regular grid hypothesis closest to a true regular grid.

14. The apparatus according to claim 13, wherein the imaging system comprises an electronic pen or pointing device.

15. The apparatus according to claim 13, further comprising machine readable instructions to:

identify triples of the surface pattern points in which the surface pattern points are co-linear to one another;

identify sets of the triples that are co-linear to one another;

delete those sets of co-linear triples that have a cross-ratio value outside the range of 0.225 to 0.275; and fit a line hypothesis to each of the remaining sets of co-linear triples.

16. The apparatus according to claim 13, further comprising machine readable instructions to:
   select a pair of straight line hypotheses and determine a vanishing point and associated line pencil for the pair of straight line hypotheses;
   determine the residual to the line pencil for the remaining straight line hypotheses in the cluster and determine a number of line hypotheses whose residual is within a predetermined residual range; and
   evaluate further pairs of straight line hypotheses and select the line pencil for which the number of straight line hypotheses whose residual is within the predetermined residual range is the greatest.

17. The apparatus according to claim 13, further comprising machine readable instructions to:
   select a pair of line pencil hypotheses to form a regular grid hypothesis; and
   determine which of the straight line hypotheses associated with the selected line pencil hypotheses conform to the regular grid hypothesis.

18. The apparatus according to claim 13, further comprising machine readable instructions to:
   determine a transformation that corrects a perspective distortion of a regular grid hypothesis;
   apply the determined transformation to the surface coded pattern; and
   apply one or more criteria to the transformed surface coded pattern to generate a measure of validity of the regular grid hypothesis.

19. The apparatus according to claim 18, wherein the applied criteria comprises at least one of:
   a proportion of regular grid points to a total points of the surface coded pattern is greater than a predetermined threshold value;
   an average number of data carrying pattern points interleaved within the regular grid points is within a predetermined range; and
   a number of regular grid cells formed by the regular grid hypothesis is above a predetermined value.

* * * * *

UNITED STATES PATENT AND TRADEMARK OFFICE
CERTIFICATE OF CORRECTION

PATENT NO. : 8,300,941 B2  
APPLICATION NO. : 12/179762  
DATED : October 30, 2012  
INVENTOR(S) : Maurizio Pilu et al.

Page 1 of 1

It is certified that error appears in the above-identified patent and that said Letters Patent is hereby corrected as shown below:

In column 9, line 36, in Claim 6, after "method" insert -- of --.

In column 10, line 40, in Claim 13, before "surface" delete "ceded".

Signed and Sealed this  
Nineteenth Day of February, 2013

Teresa Stanek Rea  
*Acting Director of the United States Patent and Trademark Office*